United States Patent [19]

Desmond et al.

[11] Patent Number: 4,705,675

[45] Date of Patent: Nov. 10, 1987

[54] SYNTHESIS OF MOLECULAR SIEVING METALLOSILICATES USING SILICA-TRANSITION METAL OXIDE SOLS

[75] Inventors: Michael J. Desmond, Cleveland Hts.; Marc A. Pepera, Northfield Center; James L. Callahan, Wooster, all of Ohio

[73] Assignee: The Standard Oil Company, Cleveland, Ohio

[21] Appl. No.: 672,286

[22] Filed: Nov. 16, 1984

[51] Int. Cl.[4] ............................................. C01B 33/20
[52] U.S. Cl. ..................................... 423/326; 423/328; 423/329; 423/330; 502/77
[58] Field of Search .................. 502/77; 423/326, 328, 423/329

[56] References Cited

U.S. PATENT DOCUMENTS

| | | | |
|---|---|---|---|
| 3,864,142 | 2/1975 | Kovarik | 252/313 S |
| 3,941,871 | 3/1976 | Dwyer et al. | 423/328 |
| 4,208,305 | 6/1980 | Kouwenhoven et al. | 423/328 |
| 4,299,808 | 11/1981 | Klotz | 423/331 |
| 4,371,628 | 2/1983 | Nanne et al. | 423/328 |
| 4,410,501 | 10/1983 | Taramasso et al. | 502/242 |
| 4,451,388 | 5/1984 | Payne | 252/313 S |
| 4,478,742 | 10/1984 | Payne | 252/313 S |

FOREIGN PATENT DOCUMENTS

| | | | |
|---|---|---|---|
| 2024790 | 1/1980 | United Kingdom | 423/329 |
| 2101110 | 1/1983 | United Kingdom | 423/329 |

Primary Examiner—John Doll
Assistant Examiner—Jackson Leeds
Attorney, Agent, or Firm—Sue E. Phillips; Joseph G. Curatolo; Larry W. Evans

[57] ABSTRACT

A method for preparing a molecular sieving metallosilicate is disclosed which comprises (A) providing an aqueous dispersion of colloidal particles comprising contiguous mixtures of silica and the oxide of a transition metal selected from the group consisting of Sc, Ti, V, Cr, Mn, Fe, Co, Ni, Zn, Zr, Y or a mixture of two or more of said metals;

(B) mixing an effective amount of a mineralizing agent and/or synthesis directing agent with said dispersion to form a gel; and (C) maintaining said gel at a temperature of about 80° C. to about 300° C. for an effective period of time to provide said metallosilicate.

30 Claims, No Drawings

SYNTHESIS OF MOLECULAR SIEVING METALLOSILICATES USING SILICA-TRANSITION METAL OXIDE SOLS

TECHNICAL FIELD

This invention relates to molecular sieves and, more particularly to molecular sieving metallosilicates. Specifically, this invention relates to a process for preparing molecular sieving metallosilicates using silica-transition metal oxide sols.

BACKGROUND OF THE INVENTION

The term "molecular sieve" refers to a wide variety of positive ion containing crystalline materials of both natural and synthetic varieties which exhibit the property of acting as sieves on a molecular scale. A major class of molecular sieves are crystalline aluminosilicates, although other crystalline materials are included in the broad definition. Examples of such other crystalline materials include coal, special active carbons, porous glass, microporous beryllium oxide powders, and layer silicates modified by exchange with organic cations. See, D. W. Breck, "Zeolite Molecular Sieves: Structure, Chemistry, and Use", John Wiley & Sons, 1974.

Zeolites are crystalline, hydrated framework aluminosilicates which are based on a three-dimensional network of $AlO_4$ and $SiO_4$ tetrahedra linked to each other by sharing all of the oxygens.

Zeolites may be represented by the empirical formula $$M_{2/n}O \cdot Al_2O_3 \cdot xSiO_2 \cdot yH_2O$$

wherein, x is generally equal to or greater than 2 since $AlO_4$ tetrahedra are joined only to $SiO_4$ tetrahedra, and n is the cation valence. The framework contains channels and interconnected void which are occupied by the cation, M, and water molecules. The cations may be mobile and exchangeable to varying degrees by other cations. Intracrystalline zeolitic water in many zeolites is removed continuously and reversibly. In many other zeolites, mineral and synthetic, cation exchange or dehydration may produce structural changes in the framework. Ammonium and alkylammonium cations may be incorporated in synthetic zeolites, e.g., $NH_4$, $CH_3NH_3$, $(CH_3)_2NH_2$, $(CH_3)_3NH$, and $(CH_3)_4N$. In some synthetic zeolites, aluminum cations may be substituted by gallium ions and silicon ions by germanium or phosphorus ions. The latter necessitates a modification of the structural formula.

The structural formula of a zeolite is best expressed for the crystallographic unit cell as: $M_{x/n}[(AlO_2)_x(SiO_2)_y] \cdot wH_2O$ where M is the cation of valence n, w is the number of water molecules and the ratio y/x usually has values of 1–100 depending upon the structure. The sum (x+y) is the total number of tetrahedra in the unit cell. The complex within the [ ] represents the framework composition.

The zeolites described in the patent literature and published journals are designated by letters or other convenient symbols. Exemplary of these materials are Zeolite A (U.S. Pat. No. 2,882,243), Zeolite X (U.S. Pat. No. 2,882,244), Zeolite Y (U.S. Pat. No. 3,130,007), Zeolite ZSM-5 (U.S. Pat. No. 3,702,886), Zeolite ZSM-11 (U.S. Pat. No. 3,709,979), and Zeolite ZSM-12 (U.S. Pat. No. 3,832,449).

It is well known to use colloidal silica as the silica source for zeolite synthesis. U.S. Pat. No. 3,459,501 discloses the use of preformed silica-alumina hydrosols or hydrogels in the synthesis of faujasite.

Although there are 34 species of zeolite minerals and about 100 types of synthetic zeolites, only a few have been found to have practical significance. Many of the zeolites, after dehydration, are permeated by very small channel systems which are not interpenetrating and which may contain serious diffusion blocks. In other cases dehydration irreversibly disturbs the framework structure and the positions of metal cations, so that the structure partially collapses and dehydration is not completely reversible. To be efficiently used as a molecular sieve, the structure of the zeolite after complete dehydration must remain intact.

There has been considerable interest in developing metallosilicates other than aluminosilicates which exhibit molecular sieve characteristics. For example, U.S. Pat. Nos. 3,329,480 and 3,329,481 disclose crystalline zircano-silicates and titano-silicates, respectively. U.S. Pat. No. 3,329,384 discloses group IV-B metallosilicates. U.S. Pat. Nos. 4,208,305, 4,238,315 and 4,337,176 disclose iron silicates. U.S. Pat. No. 4,329,328 discloses zinco-, stanno-, and titano-silicates. European patent application Nos. 0 038 682 and 0 044 740 disclose cobalt silicates. European patent application No. 0 050 525 discloses nickel silicate.

U.K. patent application GB No. 2,024,790 A discloses a silica-based material which has been modified with one or more elements which have entered the crystalline lattice of the silica in place of silicon atoms of the silica or in the form of salts of bisilicic or polysilicic acids. The elements identified as being suitable for making such silica-based materials are chromium, beryllium, titanium, vanadium, manganese, iron, cobalt, zinc, zirconium, rhodium, silver, tin, antimony and boron.

U.S. Pat. No. 4,299,808 discloses chromosilicates formed by reacting an aqueous mixture of an oxide of silicon, a compound of chromium, a hydroxide of an alkali or an alkaline earth metal, and an alkylammonium cation or a precursor of an alkylammonium cation.

There remains a need for a suitable method for preparing metallosilicates that exhibit molecular sieve character whereby the metal is introduced into the crystalline structure in a direct, efficient and primary fashion. Such a method would preferably involve introducing the metal in the original synthesis mixture.

SUMMARY OF THE INVENTION

The present invention relates to a method for making metallosilicates which exhibit molecular sieve character. An advantage of the method of the present invention is that the metal is introduced into the crystalline structure in a direct and primary fashion. That is, the metal is introduced in the original synthesis mixture.

Broadly stated, the present invention contemplates the provision of a method for preparing a molecular sieving metallosilicate comprising
(A) providing an aqueous dispersion of colloidal particles comprising contiguous mixtures of silica and the oxide of a transition metal selected from the group consisting of Sc, Ti, V, Cr, Mn, Fe, Co, Ni, Zn, Zr, Y or a mixture of two or more of said metals;
(B) mixing an effective amount of a mineralizing agent and/or synthesis directing agent with said dispersion to form a gel; and (C) maintaining said gel at a temperature of about 80° C. to about 300° C. for an effective period of time to provide said metallosilicate.

DETAILED DESCRIPTION OF THE PREFERRED EMBODIMENT

The colloidal dispersions used in accordance with the invention, which are sometimes referred to as co-sols, are aqueous systems containing colloidal particles constituted of contiguous mixtures of silica and the oxide of a transition metal selected from the group consisting of Sc, Ti, V, Cr, Mn, Fe, Co, Ni, Zn, Zr, Y or a mixture of two or more of said metals. Preferably the transition metal is Cr, Zr, Ti or Fe. These dispersions typically have up to about 70% by weight solids, preferably from about 5% to about 40% by weight solids. The mole ratio of Si to transition metal in these dispersions is typically from about 5 to about 100, preferably from about 10 to about 50.

These dispersions usually contain an effective amount of a stabilizing agent to stabilize the colloidal system. These stabilizing agents can be anions or cations. Examples of useful cations include ammonium and the alkali metals, particularly sodium. Examples of the anions include acetate and the halogens. Generally the level of addition of such stabilizing agents is up to about 10% by weight of the total solids in the colloidal system.

The colloidal particles are generally of sub-micron size and typically are constituted of silica cores coated with the desired transition metal oxide. The procedures for preparing such colloidal particles are known to those skilled in the art and thus need not be described herein.

Examples of commercially available colloidal dispersions that are suitable for use with the present invention include the following sols available from Nalco Chemical Company: TX-811 which is identified as a zirconium coated silica sol having a total solids content of 21.3% by weight, a silica content of about 19.9%, a $ZrO_2$ content about 1.43%, a pH of 3.1, a specific gravity of 1.156, an average particle size of 20 millimicrons and a viscosity of 4.2 cps.; TX-812 which is identified as a chromium coated silica sol having a total solids content of 19.88% by weight, a silica content of 18.38%, a $Cr_2O_3$ content of 1.5%, a pH of 3.2, an average particle size of 20 millimicrons, a specific gravity of 1.146 and a viscosity of 4 cps.; TX-965 which is identified as an iron coated silica sol having a total solids content of 20.5% by weight, a silica content of 19.2%, an $Fe_2O_3$ content of 1.3%, a pH of 10.6, a specific gravity of 1.142, an average particle size of 20 millimicrons, and a viscosity of 5.0 cps.; TX-912SQ which is identified as a titanium coated silica sol having a total solids content of 14.4% by weight, a silica content of 12.2%, a $TiO_2$ content of 2%, a pH of 10.4 and an average particle size of 20 millimicrons; TX-947 which is identified as an iron coated silica sol having a total solids content of 12.2% by weight, a silica content of 11.9%, a $Fe_2O_3$ content of 0.3%, a pH of 9.8 and an average particle size of 20 millimicrons; and TX-817SQ which is identified as a titanium coated silica sol having a total solids content of 20% by weight, a silica content of 19.5%, a $TiO_2$ content of 0.5%, a pH of 9.8 and an average particle size of 20 millimicrons.

The mineralizing agent and/or synthesis directing agent is provided in an effective amount to assist in forming the gel provided for in step (B) of the inventive process. Some of these agents are believed to function as templating agents. These mineralizing or synthesis directing agents can be the cation of an amine or alkanol amine compound, alkyl substituted amine or alkanol amine compound, ammonium or alkyl ammonium compound, alkali or alkaline earth metal compound, or alkyl phosphonium or alkyl arsonium compound. Alkyl groups have up to about six carbon atoms. The alkyl ammonium, alkyl phosphonium and alkyl arsonium compounds can be mono-, di-, tri- or tetra-alkyl compounds. In cases wherein more than one alkyl group is present, the alkyl groups can be the same or different. These compounds include the oxides, hyroxides, inorganic salts (e.g., nitrates, phosphates, halides, carbonates, silicates, aluminates and the like) as well as the organic salts, (e.g., acetates, formates, butyrates, propionates, benzylates and the like). Preferred alkyl ammonium compounds are the tetraalkyl- (e.g., tetramethyl-, tetrapropyl) ammonium hydroxides and halides (e.g., chloride and bromide). The alkali and alkaline earth metal compounds include sodium, potassium and calcium salt or hydroxide. The amines, alkyl substituted amines, alkanol amines and alkyl substituted alkanol amines include primary, secondary and tertiary mono- or polyamines of up to about six carbon atoms. The alkanol amines and alkyl substituted alkanol amines can be monohydric or polyhydric. Examples include methyl- and ethyl amine, dimethyl- and diethyl-amine, trimethyl- and triethyl amine, diethylmethyl amine, 2-hydroxyethylamine, 3-hydroxybutyl amine, diethanolamine, diethylethanol amine, di-(2-hydroxypropyl amine), N,N,N'-tri-(hydroxy methyl)ethylene-diamine, etc.

In the method of the present invention, the above colloidal dispersion and mineralizing and/or synthesis directing agent are thoroughly mixed with the result being the formation of a gel. The gel is placed in a reactor. The reactor is preferably an enclosed reactor (e.g., a static bomb style reactor). The contents are heated to a temperature in the range of about 80° C. to about 300° C., preferably about 125° C. to about 200° C., for an effective period of time to provide the desired molecular sieving metallosilicate, preferably about 4 hours to about 30 days, more preferably about one to about ten days. The pressure within the reactor is preferably at least the vapor pressure of water at the temperature of the reactor contents. The contents of the reactor are then allowed to cool to room temperature. The crystalline solids are separated from the mother liquor and washed thoroughly with water. Separation can be effected by conventional filtration techniques. An advantage of the invention is that simplified filtration techniques (i.e., centrifuge and similar techniques are not necessary) can be used due to the efficient crystallization that takes place. The solids can be washed with water and optionally an acid solution, e.g., 10% hydrochloric acid solution. The crystalline solids are then allowed to dry in air, such solids being the desired molecular sieving metallosilicates of the invention.

The metallosilicates prepared in accordance with the invention can be represented in terms of mole ratios by the formula $$aA_2O:bDO_{n/2}:cEO_{m/2}:MO_2:dSiO_2:eH_2O$$

wherein

A is a hydrogen, ammonium, alkyl ammonium, alkyl phosphonium or alkyl arsonium ion, or a mixture thereof with the alkyl groups having up to about 6 carbon atoms;

D is an alkali or alkaline earth metal ion, or a mixture thereof;

E is a metallic impurity selected from the group consisting of Al, Ga or mixtures thereof or other metal resulting from impurities in the starting materials (E is preferably not present);

M is selected from the group consisting of Sc, Ti, V, Cr, Mn, Fe, Co, Ni, Zn, Zr, Y or a mixture thereof;

a is a number ranging from zero to about 25, preferably from zero to about 12;

b is a number ranging from zero to about 3, preferably from zero to about 2;

c is a number ranging from zero to about 0.4, preferably from zero to about 0.1, and most preferably zero;

d is a number ranging from about 3 to about 300, preferably from about 5 to about 50;

e is a number ranging from zero to about 120, preferably from zero to about 40;

n is the valence of D; and m is the valence of E.

The metallosilicates prepared in accordance with the invention possess a definite distinguishing crystalline structure whose X-ray diffraction pattern shows the following significant lines:

TABLE I

| Interplanar Spacing d(A) | Relative Intensity |
|---|---|
| 11.1 ± 0.2 | s. |
| 10.0 ± 0.2 | m.-s. |
| 7.45 ± 0.15 | w. |
| 6.40 ± 0.03 | w. |
| 4.61 ± 0.08 | w. |
| 4.39 ± 0.02 | w. |
| 3.84 ± 0.08 | s. |
| 3.77 ± 0.02 | m.-s. |
| 3.73 ± 0.01 | s. |
| 3.65 ± 0.05 | m.-s. |
| 3.05 ± 0.03 | w. |
| 2.99 ± 0.02 | w. |
| 2.00 ± 0.02 | w. |

The values were determined by standard techniques. In Table I, the relative intensities are given in terms of symbols: s.=strong, m.=medium, and w.=weak.

The metallosilicates can be heat treated at a temperature of about 300° C. to about 900° C., preferably about 400° C. to about 600° C. in an inert, oxidizing or reducing atmosphere for a sufficient time to pyrolyze any synthesis directing agent intermixed with such metallosilicates. The time period for this heat treating step is dependent upon the mass of material being treated. Preferably the heat treating step is conducted for at least about 30 minutes, but this time period can be more or less than 30 minutes depending upon the mass of material being treated. The inert atmosphere is preferably nitrogen, argon, helium or neon. The reducing atmosphere is hydrogen or a mixture of hydrogen and one of the above-indicated inert gases. The reducing atmosphere can thus contain from about 1% to about 100% hydrogen, preferably about 1% to about 20% hydrogen, with the remainder being inert gas. The oxidizing atmosphere can be oxygen or a mixture of oxygen and one of the above-indicated inert gases. The oxidizing atmosphere can thus contain from about 1% to about 100% oxygen, preferably from about 1% to about 20% oxygen with the remainder being inert gas. A preferred oxidizing atmosphere is air. The X-ray diffraction pattern for these heat treated metallosilicates shows the following significant lines:

| Interplanar Spacing d(A) | Relative Intensity |
|---|---|
| 11.2 ± 0.2 | s. |
| 10.2 ± 0.2 | s. |
| 9.8 ± 0.2 | m. |
| 6.74 ± 0.1 | w. |
| 6.38 ± 0.1 | w. |
| 6.01 ± 0.08 | w. |
| 5.75 ± 0.08 | w. |
| 5.61 ± 0.08 | w. |
| 4.38 ± 0.06 | w. |
| 3.86 ± 0.05 | s. |
| 3.84 ± 0.05 | s. |
| 3.73 ± 0.05 | s. |
| 3.66 ± 0.04 | w.-m. |
| 3.00 ± 0.02 | w. |
| 2.015 ± 0.01 | w. |
| 1.995 ± 0.01 | w. |

The metallosilicates produced in accordance with the invention can be cation exchanged with an ammonium salt or a salt of a catalytically active metal. The salt of catalytically active metal is preferably the salt of a Group VIII, IB or IIB metal, with zinc, copper, nickel, cobalt and iron being preferred. The anionic portions of these salts are preferably inorganic and include the nitrates, phosphates, carbonates, silicates, aluminates and halogens. The cation exchange procedure employed herein is entirely conventional. Briefly, the metallosilicate and the ammonium salt or salt of catalytically active metal are disposed in water for a few minutes to several hours, preferably about one to about ten hours, and maintained at about room temperature to about the boiling point of the water, then filtered and washed. This exchange procedure can be carried out once or repeatedly depending on the degree of exchange required.

Optionally, the cation-exchanged metallosilicate can be heat treated in an inert, oxidizing or reducing atmosphere using the heat treating procedures described above to convert the cation-exchanged species to a more active form. This heat treating procedure is particularly suitable for driving off ammonia from an ammonium-metallosilicate to convert such metallosilicate to the acid form.

An advantage of the present invention is that the metallosilicates produced therefrom exhibit improved crystallinity over metallosilicates produced in accordance with prior art methods wherein the metals of such prior art methods are derived from simple metal salts rather than the co-sols required by the present invention. The metallosilicates produced herein are generally in excess of about one micron in size while those of such prior art methods are often less than about one micron in size. Thus the morphology of the crystals produced in accordance with the present invention is significantly improved over the crystals produced in accordance with prior art methods.

The metallosilicates prepared in accordance with the present invention can be used in many of the known applications for zeolites and molecular sieves. The crystalline structure of these metallosilicates make them particularly suitable as catalysts for converting methanol to liquid hydrocarbon fuels and for upgrading synthesis gas. These metallosilicates are also useful in xylene isomerizations and ethyl benzene synthesis.

In order to further illustrate the present invention, the following examples are provided. Unless otherwise indicated, in the following examples as well as throughout the specification and in the claims, all parts and percentages are by weight, and all temperatures are in degrees centigrade.

EXAMPLE 1

20 parts of Nalco sol TX-812 were mixed with 0.91 parts of tetrapropylammonium bromide in a polypropylene beaker. 2.78 parts of a 50% sodium hydroxide solution were added to the beaker contents with stirring with the result being the formation of a gel. The mole ratio of Si to Cr was 15.5. The mole ratio of Si to sodium was 1.58. A 9.0 part sample of the gel was placed in a 13 ml. volume Teflon liner. The sample was placed in an autoclave which was operated at a temperature of 175° C. The sample was removed after 42 hours. The crystalline solids were separated from their mother liquor by filtering, and washed with water, a 10% hydrochloric acid solution, and then washed thoroughly with water to provide the desired crystalline product. The crystalline solids exhibited the following X-ray diffraction pattern (Cu $k_\alpha$ radiation):

| Interplanar Spacing d(A) | Relative Intensity |
| --- | --- |
| 11.2 | s. |
| 10.0 | m. |
| 7.50 | w. |
| 6.38 | w. |
| 4.61 | w. |
| 4.37 | w. |
| 3.85 | s. |
| 3.76 | m. |
| 3.72 | s. |
| 3.65 | s. |
| 3.06 | w. |
| 2.99 | w. |
| 1.99 | w. |

EXAMPLE 2

30 parts of Nalco sol TX-812 were mixed with 1.36 parts of tetrapropylammonium bromide in a polypropylene beaker. 4.17 parts of a 50% sodium hydroxide solution were added to the beaker contents with stirring with the result being the formation of a gel. The mole ratio of Si to Cr was 15.5. The mole ratio of Si to sodium was 1.58. A 16 part sample of the gel was placed in a 23 ml. volume Teflon liner. The sample was placed in an autoclave which was operated at a temperature of 150° C. The sample was removed after 66 hours. The crystalline solids were separated from their mother liquor by filtering, washed with water, a 10% hydrochloric acid solution, and then washed thoroughly with water to provide the desired crystalline product. The crystalline solids had the following analysis: 28% Si; 0.051% Al; 0.43% Na; and 5.4% Cr. The mole ratios for these crystalline solids were: Si/Cr=9.6; Na/Cr=0.18; and Al/Cr=0.02. These crystalline solids exhibited the following X-ray diffraction pattern (Cu $k_\alpha$ radiation):

| Interplanar Spacing d(A) | Relative Intensity |
| --- | --- |
| 11.3 | s. |
| 10.2 | m. |
| 7.50 | w. |
| 6.41 | w. |
| 4.65 | w. |
| 4.40 | w. |
| 3.87 | s. |
| 3.79 | m. |
| 3.74 | s. |
| 3.67 | s. |
| 3.07 | w. |
| 3.01 | w. |
| 2.010 | w. |
| 1.995 | w. |

EXAMPLE 3

13.6 parts of Nalco sol TX-912SQ were mixed with 0.46 parts of tetrapropylammonium bromide in a polypropylene beaker. 0.68 parts of a 50% sodium hydroxide solution were added to the beaker contents with stirring with the result being the formation of a gel. The mole ratio of Si to Ti was 8.26. The mole ratio of Si to sodium was 2.57. A 9 part sample of the gel was placed in a 13 ml. volume Teflon liner. The sample was placed in an autoclave which was operated at a temperature of 175° C. and recovered after 14 days. The crystalline solids were separated from their mother liquor by filtering and washed thoroughly with water to provide the desired crystalline product. The crystalline solids had the following analysis: 34.3% Si; 0.086% Al; 4.4% Na; and 4.2% Ti. The mole ratios for these crystalline solids were: Si/Ti=13.8; Na/Ti=2.2; and Al/Ti=29.7. These crystalline solids exhibited the following X-ray diffraction pattern (Cu $k_\alpha$ radiation):

| Interplanar Spacing d(A) | Relative Intensity |
| --- | --- |
| 11.3 | s. |
| 10.1 | m. |
| 9.8 | w. |
| 7.50 | w. |
| 6.43 | w. |
| 4.64 | w. |
| 4.40 | w. |
| 3.87 | s. |
| 3.77 | m. |
| 3.74 | s. |
| 3.67 | s. |
| 3.06 | w. |
| 2.99 | w. |
| 2.010 | w. |
| 1.995 | w. |

EXAMPLE 4

9.55 parts of Nalco sol TX-965 were mixed with 0.46 parts of tetrapropylammonium bromide in a polypropylene beaker. 0.88 parts of a 50% sodium hydroxide solution were added to the beaker contents with stirring with the result being the formation of a gel. The mole ratio of Si to Fe was 23.5. The mole ratio of Si to sodium was 2.78. A 9 part sample of the gel was placed in a 13 ml. volume Teflon liner. The sample was placed in an autoclave which was operated at a temperature of 175° C. and recovered after 66 hours. The crystalline solids were separated from their mother liquor by filtering and washed thoroughly with water and a 10% hydrochloric acid solution to provide the desired crystalline product. The crystalline solids had the following analysis: 38% Si; 0.07% Al; 2.0% Na; and 2.8% Fe. The mole ratios for these crystalline solids were: Si/Fe=27; Na/Fe=1.74; and Al/Fe=19.3. These crystalline solids exhibited the following X-ray diffraction pattern (Cu $k_\alpha$ radiation):

| Interplanar Spacing d(A) | Relative Intensity |
|---|---|
| 11.25 | s. |
| 10.1 | m. |
| 9.8 | w. |
| 7.55 | w. |
| 6.38 | w. |
| 4.63 | w. |
| 4.40 | w. |
| 3.86 | s. |
| 3.77 | m. |
| 3.73 | s. |
| 3.66 | s. |
| 3.06 | w. |
| 2.99 | w. |
| 2.00 | w. |

While the invention has been explained in relation to its preferred embodiment, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method for making a molecular sieving metallosilicate comprising the steps of:
   (A) providing an aqueous colloidal dispersion of colloidal particles comprising silica cores coated with the oxide of a transition metal selected from the group consisting of Sc, Ti, V, Cr, Mn, Fe, Co, Ni, Zn, Zr, Y or a mixture of two or more of said metals;
   (B) mixing an effective amount of an mineralizing agent and/or synthesis directing agent with said dispersion to form a gel; and
   (C) maintaining said gel at a temperature of about 80° C. to about 300° C. for an effective period of time to provide said metallosilicate.

2. The method of claim 1 wherein the solids content of said dispersion ranges up to about 70% by weight solids.

3. The method of claim 1 wherein the solids content of said dispersion ranges from about 5% to about 40% by weight solids.

4. The method of claim 1 wherein the mole ratio of Si to transition metal in said dispersion is in the range of about 5 to about 100.

5. The method of claim 1 wherein the mole ratio of Si to transition metal in said dispersion is in the range of about 10 to about 50.

6. The method of claim 1 wherein said dispersion includes an effective amount of a stabilizing agent to stabilize said dispersion.

7. The method of claim 6 wherein said stabilizing agent is a cation or an anion.

8. The method of claim 1 wherein said transition metal is Cr, Zr, Ti or Fe.

9. The method of claim 1 wherein said dispersion comprises an aqueous dispersion of submicron silica particles coated with $Cr_2O_3$.

10. The method of claim 1 wherein said dispersion comprises an aqueous dispersion of submicron silica particles coated with $TiO_2$.

11. The method of claim 1 wherein said dispersion comprises an aqueous dispersion of submicron silica particles coated with $Fe_2O_3$.

12. The method of claim 1 wherein said dispersion comprises an aqueous dispersion of submicron silica particles coated with $ZrO_2$.

13. The method of claim 1 with the step of separating said metallosilicate from its mother liquor.

14. The method of claim 1 with the step of washing said metallosilicate.

15. The method of claim 1 with the step of heat treating said metallosilicate in an inert, oxidizing or reducing atmosphere.

16. The method of claim 15 with step of cation exchanging said heat treated metallosilicate with an ammonium salt or the salt of a catalytically active metal to provide a cation exchanged metallosilicate.

17. The method of claim 16 with the step of heat treating said cation exchanged metallosilicate in an inert, oxidizing or reducing atmosphere.

18. The method of claim 1 wherein the mole ratio of Si to said mineralizing and/or synthesis directing agent is in the range of about 0.1 to about 30.

19. The method of claim 1 wherein said mineralizing agent and/or synthesis directing agent is the cation of an amine or alkanol amine compound, ammonium or alkyl ammonium compound, alkali or alkaline earth metal compound, or alkyl phosphonium or alkyl arsonium compound.

20. The method of claim 19 wherein said alkyl ammonium compound is a mono-, di-, tri- or tetra-alkyl ammonium compound, each alkyl group having up to about six carbon atoms.

21. The method of claim 20 wherein said alkyl ammonium compound is a salt or hydroxide of tetrapropyl ammonium ion.

22. The method of claim 1 wherein said mineralizing agent and/or synthesis directing agent is a salt or hydroxide of sodium.

23. The method of claim 1 wherein said mineralizing agent and/or synthesis directing agent comprises a salt or hydroxide of sodium and a salt or hydroxide of tetrapropylammonium.

24. The method of claim 1 wherein said mixture is maintained in an enclosed container under at least the vapor pressure of water during step (C).

25. The method of claim 1 wherein the temperature during step (C) is in the range of about 125° C. to about 200° C.

26. The method of claim 1 wherein the time period for step (C) is from about 4 hours to about 30 days.

27. The method of claim 1 wherein the time period for step (C) is from about one to about ten days.

28. The method of claim 1 wherein said metallosilicate can be represented by the formula $$aA_2O:bDO_{n/2}:cEO_{m/2}:MO_2:dSiO_2:eH_2O$$

wherein
A is a hydrogen, ammonium, alkyl ammonium, alkyl phosphonium or alkyl arsonium ion, or a mixture thereof;
D is an alkali or alkaline earth metal ion, or a mixture thereof;
E is selected from the group consisting of Al, Ga or a mixture thereof;
M is selected from the group consisting of Sc, Ti, V, Cr, Mn, Fe, Co, Ni, Zn, Zr, Y or a mixture thereof;

a is a number ranging from zero to about 25;
b is a number ranging from zero to about 3;
c is a number ranging from zero to about 0.4;
d is a number ranging from about 3 to about 300;
e is a number ranging from zero to about 120;
n is the valence of D; and
m is the valence of E.

29. The method of claim 1 wherein the x-ray diffraction pattern for said metallosilicate shows the following significant lines:

| Interplanar Spacing d(A) | Relative Intensity |
|---|---|
| 11.1 ± 0.2 | s. |
| 10.0 ± 0.2 | m.-s. |
| 7.45 ± 0.15 | w. |
| 6.40 ± 0.03 | w. |
| 4.61 ± 0.08 | w. |
| 4.39 ± 0.02 | w. |
| 3.84 ± 0.08 | s. |
| 3.77 ± 0.02 | m.-s. |
| 3.73 ± 0.01 | s. |
| 3.65 ± 0.05 | m.-s. |
| 3.05 ± 0.03 | w. |
| 2.99 ± 0.02 | w. |

| Interplanar Spacing d(A) | Relative Intensity |
|---|---|
| 2.00 ± 0.02 | w. |

30. The method of claim 15 wherein the X-ray diffraction pattern for said heat-treated metallosilcates shows the following significant lines:

| Interplanar Spacing d(A) | Relative Intensity |
|---|---|
| 11.2 ± 0.2 | s. |
| 10.2 ± 0.2 | s. |
| 9.8 ± 0.2 | m. |
| 6.74 ± 0.1 | w. |
| 6.38 ± 0.1 | w. |
| 6.01 ± 0.08 | w. |
| 5.75 ± 0.08 | w. |
| 5.61 ± 0.08 | w. |
| 4.38 ± 0.06 | w. |
| 3.86 ± 0.05 | s. |
| 3.84 ± 0.05 | s. |
| 3.73 ± 0.05 | s. |
| 3.66 ± 0.04 | w.-m. |
| 3.00 ± 0.02 | w. |
| 2.015 ± 0.01 | w. |
| 1.995 ± 0.01 | w. |

* * * * *